Oct. 22, 1963    O. J. HUELSTER ETAL    3,107,408
PLASTIC STUD AND SOCKET WITH COMMON RIVET
Filed May 22, 1961
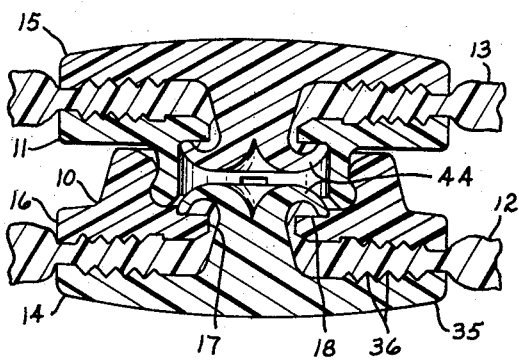
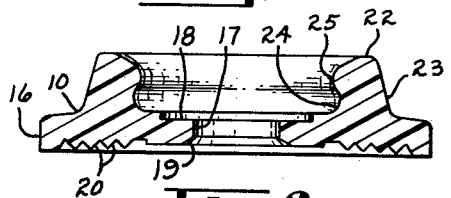
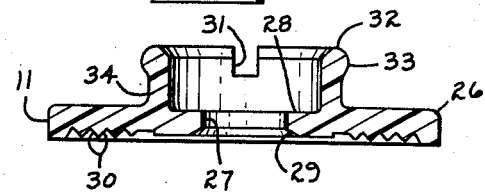
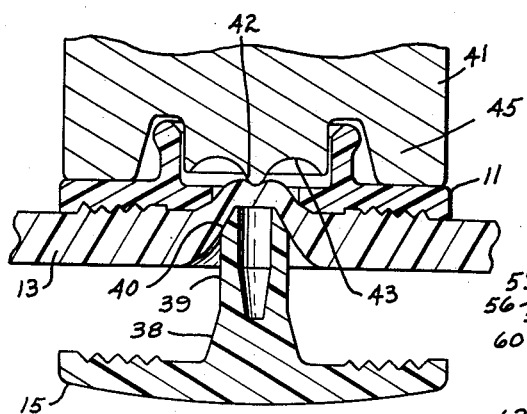
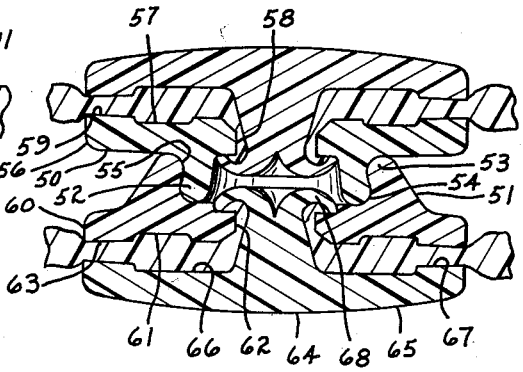
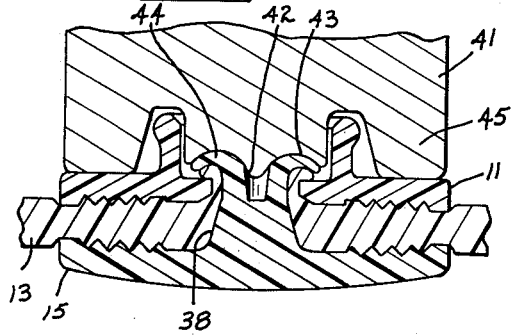
INVENTOR
Otto J. Huelster
John F. Scott
By H. F. Johnston
ATTORNEY 3,107,408
PLASTIC STUD AND SOCKET WITH
COMMON RIVET
Otto J. Huelster, Lake Plymouth, Plymouth, and John Francis Scott, Waterbury, Conn., assignors to Scovill Manufacturing Company, Waterbury, Conn., a corporation of Connecticut
Filed May 22, 1961, Ser. No. 111,593
1 Claim. (Cl. 24—208)

Our invention relates to snap fasteners wherein the fastener parts are wholly of plastic material including the devices employed to hold the fastener parts on flexible material, such as garments and the like, and is a continuation-in-part of our application Serial Number 802,129, filed March 26, 1959, and now abandoned.

One of the objects of the invention is to provide improved snap fastener elements and an attaching member having all parts made of plastic material, and wherein the same plastic attaching member is employed in attaching both fastener elements to a support, capable of piercing its way through the material to which it is attached and of being headed over to permanently secure the snap fastener elements in place.

In pursuance of this latter objective, we make use of a post of unique shape and preferably made of a material which is called acetal resin, now being marketed under the name "Delrin." It is a comparatively rigid and hard plastic material and contrary to the expectation with respect to all plastic materials, this particular one can be cold-formed to produce from the hollow walls of a post attaching member an annular head which will permanently retain its shape.

Other objects and advantages of our invention will hereinafter more fully appear.

In the accompanying drawing, we have shown for purpose of illustration, one embodiment which our invention may assume in practice.

In the drawing:

FIG. 1 is a sectional view through an assembled stud and socket construction embodying our invention;

FIG. 2 is a sectional view through the socket element, per se;

FIG. 3 is a sectional view through the stud element, per se;

FIG. 4 is a sectional view through a socket and attaching post ready for attachment to the flexible supporting material;

FIG. 5 is a view similar to FIG. 4 showing the assembly partially completed; and, FIG. 6 is a view similar to FIG. 1 showing a modified construction.

Referring now to the drawing illustrating two embodiments of the invention, there are shown a socket element 10 and a stud element 11, both of which are attached to supporting pieces of flexible material 12 and 13 by means of attaching devices or posts 14 and 15.

The socket element consists of a relatively thick dislike base 16 having a central aperture 17. The inner side of the base is recessed around the aperture 17, resulting in a depressed shoulder 18 surrounding the aperture, and a beveled surface 19 leads into the aperture on the outer surface of the base.

The lower face of the socket base 16 is formed with a series of annular angular ribs 20 intermediate the opening 17 and the periphery of the base. The crests of the ribs are arranged on a plane at a slight angle to the horizontal, approximately 2°, for reasons that will appear later.

Projecting from the upper surface of the base of the socket element is an upstanding circular flange 22 having a sloping outer surface 23 and an inner sinuous wall surface 24 providing a rounded restricted entrance portion 25 leading into the hollow socket defined by the flange 22.

The stud element 11 likewise consists of a disc-shaped base 26 provided with a central opening 27 having a flat surface 28 at its inner end and a beveled entrance portion 29 at its outer end. The outer face of the stud element base 26 is also provided with a series of annular angular ribs 30 with their crests lying on a plane at a slight angle to the horizontal similar to the socket base. Extending from the base 26 is a stud head in the form of upstanding circular flange 32 having an outer sinuous surface similar to the inner surface of the socket flange and having a rounded outwardly extending bead portion 33 running around the flange and integrally joined to said base by a portion of reduced outer diameter which provides a constricted neck 34. The circular flange 32 is preferably provided with a pair of diametrically opposed slots 31 extending into the flange approximately one-half its height to provide a greater amount of flexibility.

While the upstanding circular flanges which constitute the stud and socket elements on said fastener are relatively short, the entering engaging sections of one or both of said sections may be dimensioned to obtain the desired snap fastener action. If a lighter action is required, the socket flange entrance may be slightly enlarged and/or the stud flange may be reduced in thickness or the depth of the diametrical slot 31 increased, whereas if a harder action is desired, the thickness of the stud flange may be increased and/or the slot depth decreased, or as shown in FIG. 6, the slots may be eliminated. The stud, socket and common post elements are conveniently molded from a suitable plastic having the desired yielding and wearing qualities. For this purpose, Delrin has been found to be a highly satisfactory material.

The means by which the socket and stud elements are held in place on the flexible material of a garment or the like will be best understood by the description of the post employed for the purpose, and of the improved process of inserting and forming the post. Since the attaching device and the process are the same for both the stud and socket, it will be sufficient to describe only one.

The base 35 of the post is preferably circular and coextensive with the base of the socket or stud as the case may be. The inner surface of the post base 35 is formed in a manner similar to the opposing face of the socket or stud to provide a series of annular angular ribs 36 likewise having their crests arranged on a slight angle to the horizontal. It will be understood, as seen in FIG. 1, that this construction results in an imbedding of the ribs into the material. The crests of the ribs arranged at a slight angle to the horizontal will result in a firm gripping of the material around the outer edge of the fastener elements to provide greater resistance to movement of the fastener elements after they are once set upon the flexible material.

The stem of the post has a solid portion 38 adjacent the base, which is preferably tapered as shown, to provide greater strength where it joins the base, and projecting beyond the solid portion 38 is a hollow portion 39. Toward the end of this hollow portion, the walls are tapered inwardly to provide a comparatively sharp piercing end 40.

In the process of attaching a fastener part to the flexible material, the element is placed in proper position on the material and the post is aligned with it. Then axial pressure is applied to one of the fastener elements which will initially force the material over the stem of the post and drag some portion of said material into the opening in the fastener stud or socket element. When the post is approximately in the position shown in FIG. 4, the leading end of the post covered by the material will contact a forming tool 41 having a central tapered end 42 surrounded by an annular groove 43, whereupon the sharp piercing end of the stud co-operating with the tapered end of the forming tool will pierce its way through the material. Continued axial movement of the forming tool will cause the walls of the hollow end of the stem to roll outwardly and toward the base of the post to form an inner head 44 on the stem, the outer portion of said head 44 bearing tightly against the inner surface of the fastener element such as flat surface 23 of the stud, or directly against the shoulder 18 of the socket 10, as the case may be. As shown in FIGS. 4 and 5, the tool 41 is provided with an annular projection 45 surrounding the post-forming portion and serving to back up the base and upstanding flange of the fastener elements during the setting operation.

It is to be observed that some amount of the material of the garment is drawn up through the fastener element opening and also lodged between the adjacent surface of the fastener element and the underside of the formed head 44 in a firmly pinched state. The parts are so dimensioned that this head 44 is formed simultaneously with the base of the post coming into gripping contact with the flexible material. While a considerable portion of the flexible material will be embraced between the base of the post and the fastener element and forced into the annular grooves between the annular ribs, the anchorage between the fastener element and the flexible material is greatly strengthened where the material is forced up through the fastener element opening and pinched underneath the formed head 44. The solid portion 38 of the stem tapering toward the base 35 of the post will resist crushing and deformation of this portion in the up-setting process. It will also be observed that the taper of the walls at the end of the post stem facilitates the starting of the forming operation.

In FIG. 6, there is shown a stud element 50 and a socket element 51 having upstanding circular flanges 52 and 53, respectively. The flanges are formed with interfitted portions 54 and 55 that snap-lock into engagement with each other when the elements are axially forced together in a manner similar to that described in the first form. This construction differs from the first form in that the transverse thickness of the upstanding element flanges 52 and 53 is substantially the same and is of the proper thickness to obtain the desired snap fastener action. If a light action is required without great strength, the sections can be thinner than in other cases where more strength is required. In either case, the yieldability of either one or both of the stud and socket flanges contributes to the quality of the action and the durability of the fastener. The stud and socket elements similar to the first form, are conventionally molded from a suitable plastic having the desired yielding and wearing qualities.

The outer surface of the stud base 56 is formed with a relatively wide annular groove 57 intermediate the opening 58 and the periphery of the base. Outwardly of this groove, the lower face of the base is formed with a slight downward bevel 59 around its outer portion for reasons that will appear later. In like manner, the outer surface of the socket base 60 is also formed with a relatively wide annular groove 61 intermediate the socket opening 62 and the periphery of the base. Outwardly of the groove, the outer face of the base is also formed with a slight downward bevel 63.

The means for holding either the socket or stud element 50 or 51 on the flexible support is a post 64. The post here shown is substantially the same as that shown in the first form except that the inside surface of the post base 65 is formed in a manner similar to the opposing face of the socket and stud bases in providing a depressed portion or groove 66 and an outwardly tapering surface 67.

The manner in which the stud and socket elements 50 and 51 are attached to the flexible material by the posts 64 is the same as shown in the first form wherein the stud will be forced through the stud and socket openings 58 and 62 carrying with it some amount of flexible material that will be pinched between said openings and the stud shank, and also caught underneath the upset head 68. In the final state, the head also has a firm bearing against the inner base surface of the stud and socket elements surrounding the openings 58 and 62.

Also, it will be noted that some flexible support material will be confined within the stud and socket base grooves 57 and 61 aligned with the complemental grooves 66 of the attaching post base 65. Furthermore, the downward bevels 59 and 63 on the stud and socket bases, along with the opposed post bearing tapering surfaces, will afford a firm pinching grip on the material around the outer edge of the fastener elements to provide greater resistance to movement of the fastener elements after they are once set upon the flexible material.

As a result of our invention, it will now be clear that for the first time a complete plastic fastener has been provided which can be attached without the use of metal parts or without the inconvenience and expense of applying heat in homogeneously bonding the fastener elements to the material.

What we claim is:

A snap fastener comprising stud and socket elements consisting of plastic material which is rigid in thicker sections and flexible in thinner sections, said stud element comprising a base having a central aperture therethrough and a head in the form of an upstanding circular flange surrounding said opening and projecting from said base, said circular flange having a rounded outwardly extended bead portion extending entirely around the flange and integrally joined to the base by a portion of reduced outer diameter providing a constricted neck; said socket element also having a base with a central aperture and an upstanding circular flange projecting from the base around the opening, said socket circular flange having a constricted entrance portion and an enlarged inner portion, said entrance portion being of slightly less internal diameter than the maximum external diameter of the stud circular flange to resist passage of the head into and out of the socket cavity, at least one of said circular flanges being yieldable to a sufficient degree to permit forced passage of the head into the socket cavity, after which the flanges will snap back and hold the fastener parts against unintentional separation; and means securing each of the socket and stud members to supporting material which comprises a post of rigid plastic material having a base substantially co-extensive with the base of the socket or stud, as the case may be, a stem projecting through the supporting material and the central aperture in the stud or socket, said stem consisting of a solid portion adjacent said base and a hollow portion projecting beyond said solid portion, said hollow portion being deformed outwardly to provide an inner head integral with the stem and bearing against an inner surface around the aperture and within the confines of the circular flange on the head or socket.

References Cited in the file of this patent

UNITED STATES PATENTS

| | | |
|---|---|---|
| 1,858,441 | Fenton | May 17, 1932 |
| 1,910,951 | Hayden | May 23, 1933 |
| 2,166,894 | Jones | July 18, 1939 |
| 2,740,192 | Ogle | Apr. 3, 1956 |
| 2,859,511 | Galligher et al. | May 11, 1958 |

FOREIGN PATENTS

| | | |
|---|---|---|
| 777,870 | Great Britain | June 26, 1957 |